(12) United States Patent
Johnson et al.

(10) Patent No.: US 11,423,536 B2
(45) Date of Patent: Aug. 23, 2022

(54) SYSTEMS AND METHODS FOR BIOMEDICAL OBJECT SEGMENTATION

(71) Applicant: Advanced Solutions Life Sciences, LLC, Louisville, KY (US)

(72) Inventors: Jeromy Johnson, Waynesville, OH (US); Robert Eli, Tucson, AZ (US); Alexander Charles Schultz, Fort Wayne, IN (US); Jay Hoying, Manchester, NH (US)

(73) Assignee: Advanced Solutions Life Sciences, LLC, Louisville, KY (US)

( * ) Notice: Subject to any disclaimer, the term of this patent is extended or adjusted under 35 U.S.C. 154(b) by 112 days.

(21) Appl. No.: 16/832,989

(22) Filed: Mar. 27, 2020

(65) Prior Publication Data

US 2020/0311929 A1 Oct. 1, 2020

Related U.S. Application Data

(60) Provisional application No. 62/887,789, filed on Aug. 16, 2019, provisional application No. 62/826,254, filed on Mar. 29, 2019.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10016* (2013.01); *G06T 2207/10056* (2013.01); *G06T 2207/20081* (2013.01); *G06T 2207/20084* (2013.01); *G06T 2207/30024* (2013.01); *G06T 2207/30104* (2013.01)

(58) Field of Classification Search
CPC ............ G06T 2207/10056; G06T 2207/10016
See application file for complete search history.

(56) References Cited

U.S. PATENT DOCUMENTS

| | | |
|---|---|---|
| 2004/0085443 A1 | 5/2004 | Kallioniemi et al. |
| 2004/0142325 A1 | 7/2004 | Mintz et al. |
| 2010/0041134 A1 | 2/2010 | Forgacs et al. |
| 2015/0105891 A1* | 4/2015 | Golway ................ G06F 30/20 700/98 |
| 2016/0210411 A1* | 7/2016 | Mentis ................ G06F 3/04842 |
| 2017/0009194 A1* | 1/2017 | Golway ................ C12M 25/14 |

(Continued)

OTHER PUBLICATIONS

International Search Report and Written Opinion for corresponding PCT Application No. PCT/US2020/025347 dated Aug. 14, 2020.

*Primary Examiner* — Gandhi Thirugnanam
(74) *Attorney, Agent, or Firm* — Dinsmore & Shohl LLP (57) ABSTRACT

In one embodiment, a system for biomedical object segmentation includes one or more processors; one or more memory modules communicatively coupled to the one or more processors, and machine readable instructions stored on the one or more memory modules. The machine readable instructions cause the system to perform the following when executed by the one or more processors: receive image data of one or more biological constructs; analyze the image data to generate processed image data via a data analytics module to recognize biomedical objects; and automatically annotate the processed image data to indicate a location of one or more biological objects within the one or more biological constructs.

14 Claims, 8 Drawing Sheets

(56) References Cited

U.S. PATENT DOCUMENTS

| | | | |
|---|---|---|---|
| 2017/0046670 A1* | 2/2017 | Arjomand | G06Q 30/0279 |
| 2017/0132826 A1* | 5/2017 | Grady | G06T 11/60 |
| 2017/0200067 A1* | 7/2017 | Zhou | G06V 10/443 |
| 2017/0328817 A1* | 11/2017 | Barnes | G06T 7/33 |
| 2018/0373162 A1* | 12/2018 | Slotboom | G03F 7/705 |
| 2019/0069957 A1* | 3/2019 | Barral | G06N 20/10 |
| 2019/0083974 A1* | 3/2019 | Cambron | B01L 3/5025 |
| 2020/0307101 A1* | 10/2020 | Schultz | B29C 64/393 |
| 2020/0311929 A1* | 10/2020 | Johnson | G06N 3/08 |
| 2021/0049345 A1* | 2/2021 | Johnson | G06T 7/0012 |

\* cited by examiner

SYSTEMS AND METHODS FOR BIOMEDICAL OBJECT SEGMENTATION

CROSS-REFERENCE TO RELATED APPLICATIONS

The present application claims the benefit of U.S. Provisional Application No. 62/826,254 filed Mar. 29, 2019 and U.S. Provisional Application No. 62/887,789 filed Aug. 16, 2019, the entireties of which are hereby incorporated by reference.

TECHNICAL FIELD

The present specification generally relates to systems and methods for biomedical object segmentation and, more specifically, systems and methods for vascular and/or microscopic biomedical object segmentation.

BACKGROUND

Lab-grown or printed biological constructs may include biological structures, e.g., cells, acellular structures, vascularization, etc. Such structures are typically identified visually by trained professionals. Such detection may be difficult, tedious, and subject to human biases, which may lead to inconsistent results.

Accordingly, a need exists for alternative systems and methods for detecting biomedical objects within a biological sample to provide automated and consistent results.

SUMMARY

In one embodiment, a system for biomedical object segmentation includes one or more processors; one or more memory modules communicatively coupled to the one or more processors, and machine-readable instructions stored on the one or more memory modules. The machine readable instructions cause the system to perform the following when executed by the one or more processors: receive image data of one or more biological constructs; analyze the image data to generate processed image data via a data analytics module to recognize biomedical objects; and automatically annotate the processed image data to indicate a location of one or more biological objects within the one or more biological constructs.

In another embodiment, a training server for detection of biomedical objects include: one or more processors, one or more memory modules communicatively coupled to the one or more processors, and machine readable instructions stored in the one or more memory modules. The machine readable instructions cause the training server to perform the following when executed by the one or more processors: receive one or more training images of a biological construct; receive user annotations to the one or more training images, via a user interface device, identifying one or more biomedical objects within the one or more training images; initiate recognition of the one or more biomedical objects based on the user annotations; and store, on the one or more memory modules, identifiable characteristics of the one or more biomedical objects for automatic identification of one or more biomedical objects within a biological construct.

In yet another embodiment, a method for biomedical object segmentation includes receiving, with one or more processors, image data of one or more biological constructs; analyzing, with the one or more processors, the image data to generate processed image data via a data analytics module to recognize biomedical objects; and automatically annotating the processed image data, with the one or more processors, to indicate a location of one or more biomedical objects within the one or more biological constructs.

In yet another embodiment, a method for training a model for biomedical object segmentation includes receiving from a user, via a user interface device, a training request, receiving one or more training images of a biological construct, receiving user annotations to the one or more training images, via the user interface device, identifying one or more biomedical objects within the one or more training images, transforming, with one or more processors, the user annotations into a plurality of segmentation annotations, initiating, via a training server, recognition of the one or more biomedical objects based on the plurality of segmentation annotations, and storing, on the one or more memory modules, identifiable characteristics of the one or more biomedical objects as a trained model for access by the data analytics module to identify one or more biomedical objects within the one or more biological constructs.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to identifying biomedical structures, also known as biomedical object segmentation, within biological constructs from image data. Biomedical object segmentation may further include gathering analytic data regarding identified biomedical objects (e.g., size, number, etc.). In some embodiments, the methods and systems described herein allow for biomedical object segmentation to occur in real-time as changes occur to the biological construct (e.g., biomedical objects form or grow). As noted above, identifying biomedical structures within a biological construct may be difficult and time-consuming. Additionally, identification must generally be performed by highly trained individuals. Absence of such highly trained individuals may make it difficult to perform biomedical object segmentation. Moreover, biomedical object segmentation may be subject to human biases and errors, which could lead to inconsistent analyses/detection of biomedical objects within a biological construct. Accordingly, the present disclosure is directed to an intelligent system for performing object segmentation analysis from image data of a biological construct, which may provide faster, more consistent identification results. These and additional embodiments will be described in greater detail below.

Biological constructs may refer to any biological constructs such as lab-grown or printed biological tissue constructs. Such biological constructs may be further discussed in U.S. patent application Ser. No. 16/135,299, entitled "Well-Plate and Fluidic Manifold Assemblies and Methods," filed Sep. 19, 2018, U.S. patent application Ser. No. 15/202,675, filed Jul. 6, 2016, entitled "Vascularized In Vitro Perfusion Devices, Methods of Fabricating, and Applications Thereof," U.S. patent application Ser. No. 15/726,617, filed Oct. 6, 2017, entitled "System and Method for a Quick-Change Material Turret in a Robotic Fabrication and Assembly Platform," each of which are hereby incorporated by reference in their entireties.

It is also noted that recitations herein of "at least one" component, element, etc., or "one or more" should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

Figure 1:
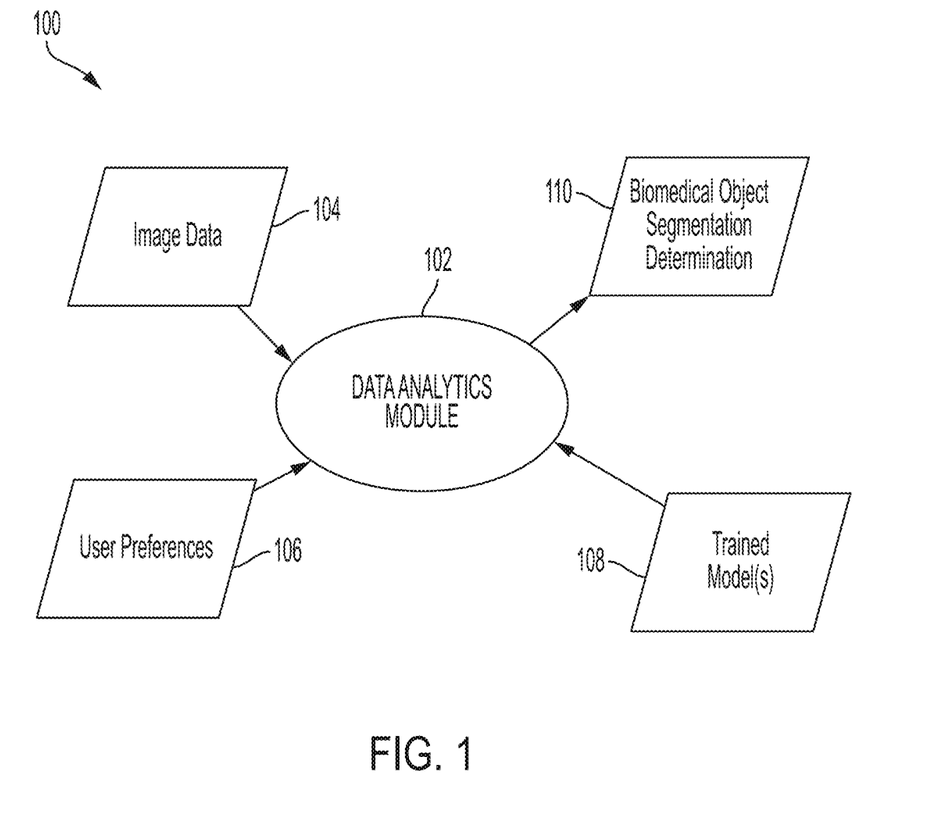
FIG. 1 generally illustrates an intelligent biomedical object segmentation solution utilizing a data analytics module, according to one or more embodiments show and described herein.

Referring now to FIG. 1, an intelligent biomedical object segmentation solution 100 uses a data analytics module 102 to automatically detect biomedical objects based on processing image data of a biological construct. As used herein "biomedical objects" may refer to any biological structure that may be present in living tissue. For example, biomedical objects may include but are not limited to vessels (e.g. blood vessels and/or branches), cells (e.g., liver cells, myocytes, etc.), internal cell structures, acellular structures, and/or other microscopic objects. In yet further embodiments, the data analytics module may further detect, poorly formed biomedical objects (e.g., a-typical development of biomedical objects), foreign objects (e.g., debris), or the like.

Various inputs may be received by the data analytics module 102 to output the biomedical object segmentation determination 110. For example, image data 104 of a biological construct may be received by the data analytics module 102 along with any user preferences 106. User preferences 106 may include particular biomedical objects to be identified by the data analytics model 102 and/or other personalization (e.g., desired outputs, color, labeling, analyzed areas, etc.) for the biomedical object segmentation determination 110.

As will be described in greater detail herein, one or more trained models 108 trained on image data training sets to generate biomedical object segmentation results may be used for intelligent biomedical object segmentation analysis. With reference to use of "training" or "trained" herein, it should be understood that, in some embodiments, a trained model 108 is trained or configured to be trained and used for data analytics as described herein and may include a collection of training data sets based on images that have been received and annotated by users. As training data sets are provided, the data analytics module 102 may perform biomedical object segmentation more reliably. In some embodiments, certain training models may be specifically formulated and stored based on particular user preferences. For example, a user may be able to recall training models 108 to be applied to new data sets from one or more memory modules, remote servers, or the like. As will be described herein, the data analytics module 102 applies the one or more trained models 108 to raw image data 104 (e.g., unannotated image data or substantially unannotated) of biological constructs and any user preferences 106 (if included) to generate the automated biomedical object segmentation determinations 110. As will be explained in greater detail below, the automated biomedical object segmentation determination 110 may include annotated image data illustrating locations of the various identified biomedical objects, analytics regarding the identified objects (e.g., types, number, volume, area, etc.). Such biomedical object segmentation determinations 110 may be displayed to a user in real-time or with minimal lag time (e.g., less than 5 minutes, less than 3 minutes, less than 1 minute, less than 30 seconds, etc.) as image data is received (e.g., which image data include video image data).

Figure 2:
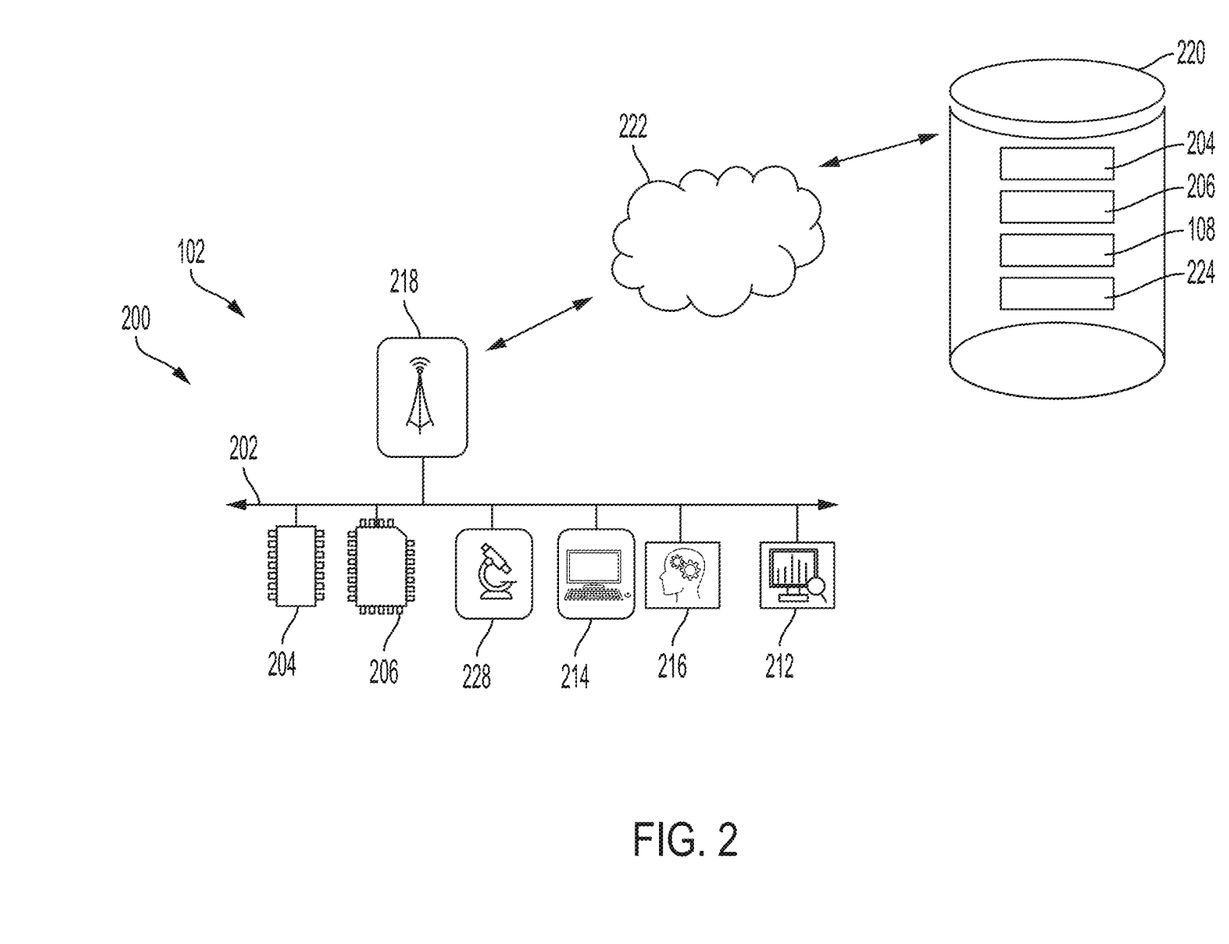
FIG. 2 schematically illustrates a system for biomedical object segmentation, according to one or more embodiments shown and described herein.

FIG. 2 illustrates a computer-implemented system 200, hereinafter "the system." The system 200 is configured for implementing a computer and software-based method, such as directed by the intelligent biomedical object segmentation solution 100 and the processes described herein, to automatically generate biomedical object segmentation determinations 110 based on received image data 104. The system 200 embodies the data analytics module 102 of FIG. 1 to generate the automated biomedical object segmentation determination 110. The system 200 may include a communication path 202, one or more processors 204, one or more memory modules 206, one or more user interface devices 214, an image analytics module 212, a machine-learning module 216, network interface hardware 218, a network 222, one or more training servers 220, and/or one or more image sensors 228. It is noted that a greater or fewer number of components may be included within the system 200 without departing from the scope of the present disclosure. The various components of the system 200 and the interaction thereof will be described in detail below.

The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the system 200. As used herein, the term "communicatively coupled" means that coupled components are capable of exchanging data signals with one another such as, for example, electrical signals via conductive medium, electromagnetic signals via air, optical signals via optical waveguides, and the like. Accordingly, communicatively coupled may refer to wired communications, wireless communications, and/or any combination thereof.

The one or more processors 204 may include any device capable of executing machine-readable instructions.

Accordingly, the one or more processors 204 may be a controller, an integrated circuit, a microchip, a computer, or any other computing device. The one or more processors 204 are communicatively coupled to the other components of system 200 by the communication path 202. Accordingly, the communication path 202 may communicatively couple any number of processors with one another, and allow the modules coupled to the communication path 202 to operate in a distributed computing environment. Specifically, each of the modules can operate as a node that may send and/or receive data.

The system 200 further includes the one or more memory modules 206, which is coupled to the communication path 202 and communicatively coupled to the one or more processors 204. The one or more memory modules 206 may be a non-transitory computer readable medium or non-transitory computer readable memory and may be configured as a nonvolatile computer readable medium. The one or more memory modules 206 may include RAM, ROM, flash memories, hard drives, or any device capable of storing machine-readable instructions such that the machine-readable instructions can be accessed and executed by the one or more processors 204. The machine readable instructions may comprise logic or algorithm(s) written in any programming language such as, for example, machine language that may be directly executed by the one or more processors 204, or assembly language, object-oriented programming (OOP), scripting languages, microcode, etc., that may be compiled or assembled into machine-readable instructions and stored on the one or more memory modules 206. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. As will be described in greater detail herein, machine-readable instructions, when executed by the one or more processors 204, may cause the system 200 to receive image data 104 of one or more biological constructs, analyze the image data 104 to generate processed image data via the data analytics module 102, and automatically annotate the processed image data to indicate a location of one or more biological objects within the image data 104 of the one or more biological constructs.

The network interface hardware 218 communicatively couples the system 200 with a computer network, such as network 222. The network interface hardware 218 is coupled to the communication path 202 such that the communication path 202 communicatively couples the network interface hardware 218 to other modules of the system 200. The network interface hardware 218 can be any device capable of transmitting and/or receiving data via a wireless network. Accordingly, the network interface hardware 218 can comprise a communication transceiver for sending and/or receiving data according to any wireless communication standard. For example, the network interface hardware 218 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

In embodiments, the network 222 may include one or more computer networks (e.g., a personal area network, a local area network, grid computing network, wide area network, etc.), cellular networks, satellite networks, and/or any combinations thereof. Accordingly, the system 200 can be communicatively coupled to the network 222 via a wide area network, via a local area network, via a personal area network, via a cellular network, via a satellite network, via a cloud network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Accordingly, the network 222 can be utilized as a wireless access point by the system 200 to access one or more servers (e.g., one or more training servers 220).

In embodiments, the one or more training servers 220 may be communicatively coupled to the other components of the system 200 via the network 222. The one or more training servers 220 and any additional servers may generally include any at least one of the one or more processors 204, at least one of the one or more memory modules 204 (e.g., cloud storage), and chipsets (e.g., graphics processing unit(s) 224) communicatively coupled to one another for delivering resources via the network 222. Resources can include providing, for example, processing, storage, software, and information from the one or more training servers 220 to the system 200 via the network 222. Additionally, it is noted that the one or more training servers 220 and any additional servers can share resources with one another over the network 222 such as, for example, via the wired portion of the network 222, the wireless portion of the network 222, or combinations thereof.

As will be described in greater detail below, the one or more training servers 220 may include any number of processors, memories, hardware, software, or the like for creation and/or storage of trained models 108 to be accessed by the various components of the system 200. For example, non-transitory machine-readable instructions stored on the one or more memory modules 206, when executed by the one or more processors 204, may cause the one or more training servers 220 to receive one or more training images of a biological construct, receive user annotations to the one or more training images, via the one or more user interface devices 114, that identify one or more biomedical objects within the one or more training images, initiate recognition (e.g., via a graphics processing unit 224) of the one or more biomedical objects based on the user annotations, and stored, on the one or more memory modules 206, the resulting trained model 108 (e.g., including identifiable characteristics of the one or more biomedical objects for automatic identification of one or more biomedical objects within a biological construct). In some embodiments, and as described in more detail herein, the user annotations may first be subjected to segmentation to provide segmentation annotations prior to transfer to the one or more training servers 220, which may simplify and improve trained model generation by the one or more training servers 220

In some embodiments, the one or more training servers 220 may generate one or more containers or container instances, each generating one or more trained models 108, which may be accessed by the one or more processors 204 of the system 200 via the network 222 for biomedical object segmentation. For example, and as will be described in greater detail herein, one or more trained models 108 may be created within containers and/or container instances which are communicatively coupled to a GPU 224, which may process training image data of a biological construct, which has been annotated by a user and received over the network 222. Processing within the containers may allow for analyzing the training image data to recognize user annotations and/or segmentation annotations and to identify indicated biomedical objects. Accordingly, the containers may generate training models which may be stored on the one or more training servers 220 (e.g., in cloud storage). Once training is complete, the container itself may be deleted, freeing storage and/or processing power, while the trained model 108 remains available to a user for later recall by the system 200.

Still referring to FIG. 2, the system 200 may further include one or more image sensors 228. The one or more image sensors 228 may include any sensor configured to collect and transmit image data 104 including cameras, video recorders, or the like. In some embodiments the one or more image sensors 228 may be incorporated into a microscope of similar device for capturing image data 104 of microscopic structures, such as some biomedical objects (e.g., cells, a-cellular structures, or the like). Such imaging sensors 108 may include, but are not limited to, IN Cell Analyzer series 2500 or 6500, available from GE Life Sciences, and imaging microscopes available of Olympus Life Science Solutions.

To allow a user to interact with various components of the system 200, the system 200 may include one or more user interface devices 214. For example, the one or more user interface devices 214 may include any number of displays, touch screen displays, and input devices (e.g., buttons, toggles, knobs, keyboards, microphones, etc.) which allow interaction and exchange of information between the user and the system 200. Using the one or more user interface devices 214, a user may input one or more desired actions (e.g., create a trained model 108, perform an object segmentation analysis on image data 104, input user preferences 106, etc.). Additionally, biomedical object segmentation determinations 110 may be displayed to the user with the one or more user interface devices 214. It is noted that user interface devices 214 may include remote user devices (e.g., PCs, smartphones, laptops, tablets, or the like) communicatively coupled to the various components of the system 200 over the network 222. In various embodiments, the one or more user interface devices 214 may include at least one of the one or more processors 204 and/or the one or more memory modules 206. Accordingly, while the system 200 is illustrated as a single, integrated system 200 in FIG. 2, in other embodiments, there can be multiple independent systems, which may operate in concert with one another over the network 222 to provide such as in a disturbed computing environment.

Still referring to FIG. 2, the system 200 may include the image analytics module 212 and the machine-learning module 216 as described above. The image analytics module 212 is configured to at least apply data analytics and artificial intelligence algorithms and trained models 108 to received images, and such as photographic images and/or video images. The machine-learning module 216 is configured for providing such artificial intelligence algorithms and trained models, such as to the image analytics module 212. The machine-learning module 216 accesses the one or more trained models 108 stored on the one or more training servers 220 or the one or more memory modules 206 for identification of biomedical objects. In embodiments, the machine-learning module 216 may include an artificial intelligence component to train or generate custom models and provide machine-learning capabilities to a neural network as described herein. By way of example, and not as a limitation, a convolutional neural network (CNN) may be utilized. The image analytics module 212 and the machine-learning module 216 may be communicatively coupled to the communication path 202 and communicatively coupled to the one or more processors 204. As will be described in further detail below, the one or more processors 204 may process input signals received from the system 200 modules and/or extract information from such signals.

Data stored and manipulated in the system 200 as described herein is utilized by the machine-learning module 216, which is able to leverage a cloud computing-based network configuration such as the cloud to apply Machine Learning and Artificial Intelligence. This machine learning application may create models that can be applied by the system 200, to make it more efficient and intelligent in execution. As an example and not a limitation, the machine-learning module 216 may include artificial intelligence components selected from the group consisting of an artificial intelligence engine, Bayesian inference engine, and a decision-making engine, and may have an adaptive learning engine further comprising a deep neural network-learning engine. It is contemplated and within the scope of this disclosure that the term "deep" with respect to the deep neural network learning engine is a term of art readily understood by one of ordinary skill in the art.

In some embodiments, at least one of the one or more processors 204, at least one of the one or more memory modules 206, the machine-learning module 216, and/or the image analytics module 212, may be part of a dedicated or separate remote server, which receives the one or more trained models 108 from the one or more training servers 220. Accordingly, biomedical object detection and/or image annotation using the machine-learning module 216 and/or the data analytics module 212 may be performed at the separate remote server, which may then be communicated over the network 222 to a user via the user interface device 214.

In use of the system 200, a user may capture image data 104 (e.g., still images and/or video images) of a biological construct. The one or more user interface devices 214 may be used to upload captured image data 104 to the system 200, such as through a web-link or application accessible through the one or more user interface devices 214. For example, image data 104 from the one or more image sensors 228 may be viewed on a graphical user interface (GUI) displayed on a display of the one or more user interface devices 214. A user may then initiate the data analytics module 102, via inputs to the system 200 with the one or more user interface devices 214, to identify biomedical structures within the image data 104.

Figure 3:
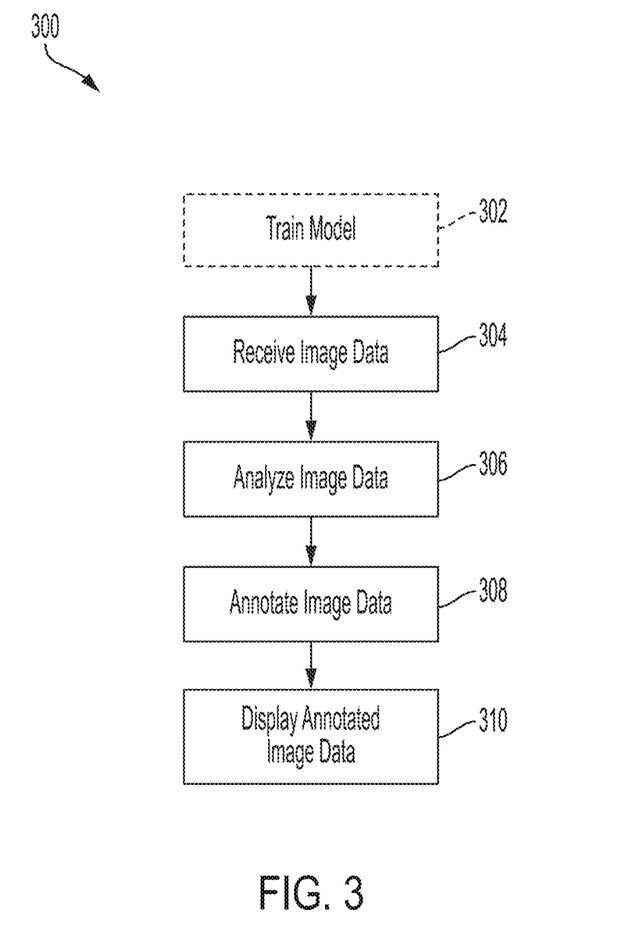
FIG. 3 illustrates a flowchart depicting a method of biomedical object segmentation, according to one or more embodiments shown and described herein.

Referring now to FIG. 3, a flowchart illustrating a method 300 of biomedical object segmentation is depicted. It is noted that while various steps are illustrated, a greater or fewer number of steps may be included without departing from the scope of the present disclosure. In various embodiments, the present method 300 and/or other methods as disclosed herein may include accessing a web portal and/or application on the one or more user interface devices 214. In some embodiments, access to the web portal and/or application may be restricted. For example, access may be password protected, such that a user may enter a username and password to securely login to the web portal and/or application.

Figure 4:
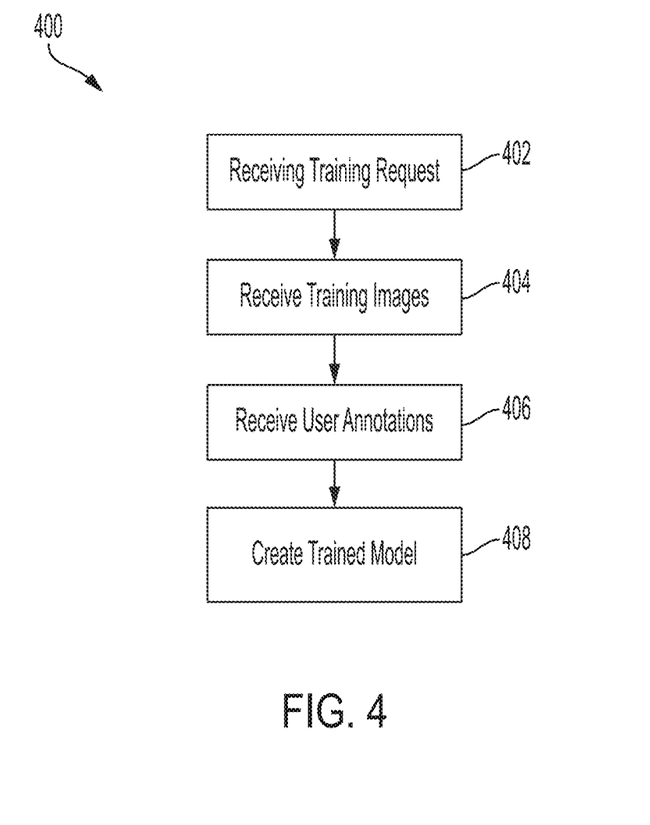
FIG. 4 illustrates a flowchart depicting a method for generating one or more trained models, according to one or more embodiments shown and described herein.

In some embodiments, a user may generate a trained model 108 using the system 200 for later use by the system 200 for automated biomedical object segmentation. Accordingly, at step 302, the method 300 may include training the system 200 to recognize biomedical objects. FIG. 4 depicts a flowchart illustrating a method 400 of preparing a trained model 108.

Figure 5A:
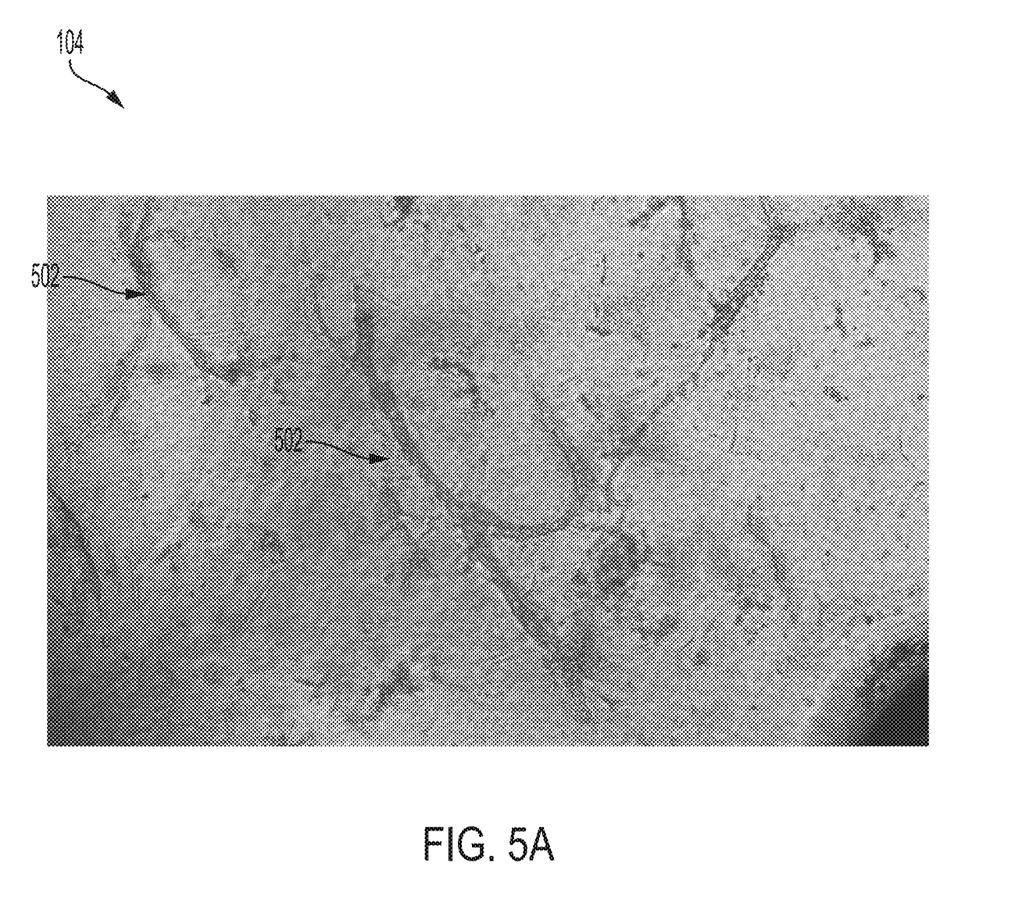
FIG. 5A depicts image data of a biological construct, according to one or more embodiments shown and described herein.
Figure 5B:
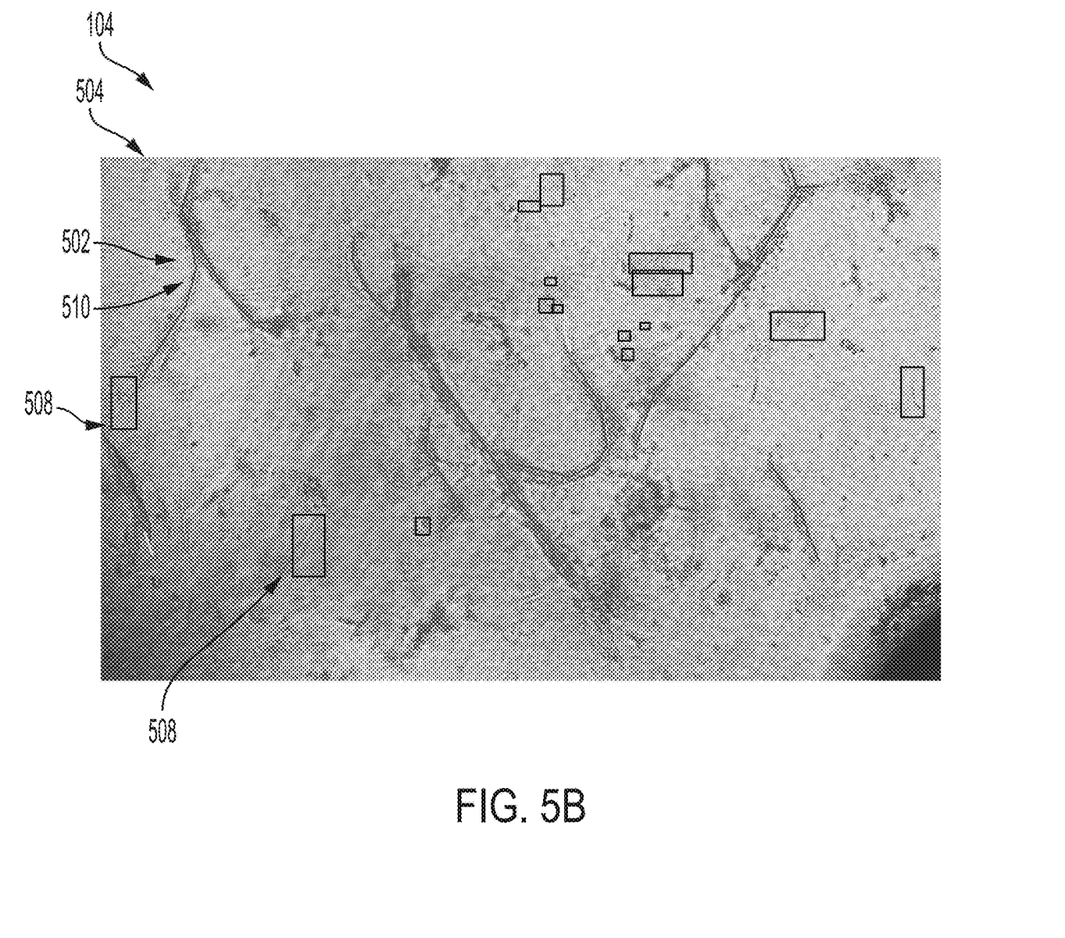
FIG. 5B depicts user annotation of the image data of FIG. 5A, according to one or more embodiments shown and described herein.

For example, at step 402 the method 400 may include receiving from a user, via the one or more user interface devices 214, a training request. For example, the training request may be selected by selecting an option present on the graphical user interface of the one or more user interface devices 214. Once the training request is received, a user may upload one or more training images of a biological construct at step 404. However, it is contemplated that there may be stock biological construct images available from the one or more training servers 220 that a user may access for personalized annotation and trained model generation. Once the one or more training images are uploaded, they may be displayed to the user on a display of the user interface device 214. The user, at step 406 may then apply annotations to the one or more training images to identify a location of one or more biological objects. For example, FIG. 5A depicts raw image data 500 uploaded to the system 200. Referring now to FIG. 5B, a user, using the one or more user interface devices 214 may provide user annotations 504 to the one or more training images to identify one or more biomedical objects of interest within the training image 500. In some embodiments, it is contemplated that biomedical objects may be identified by annotating the training image with shapes, lines, nodes, polyline (e.g., polygonal chains), and/or colors, which may indicate the type of biomedical object being detected.

Figure 5C:
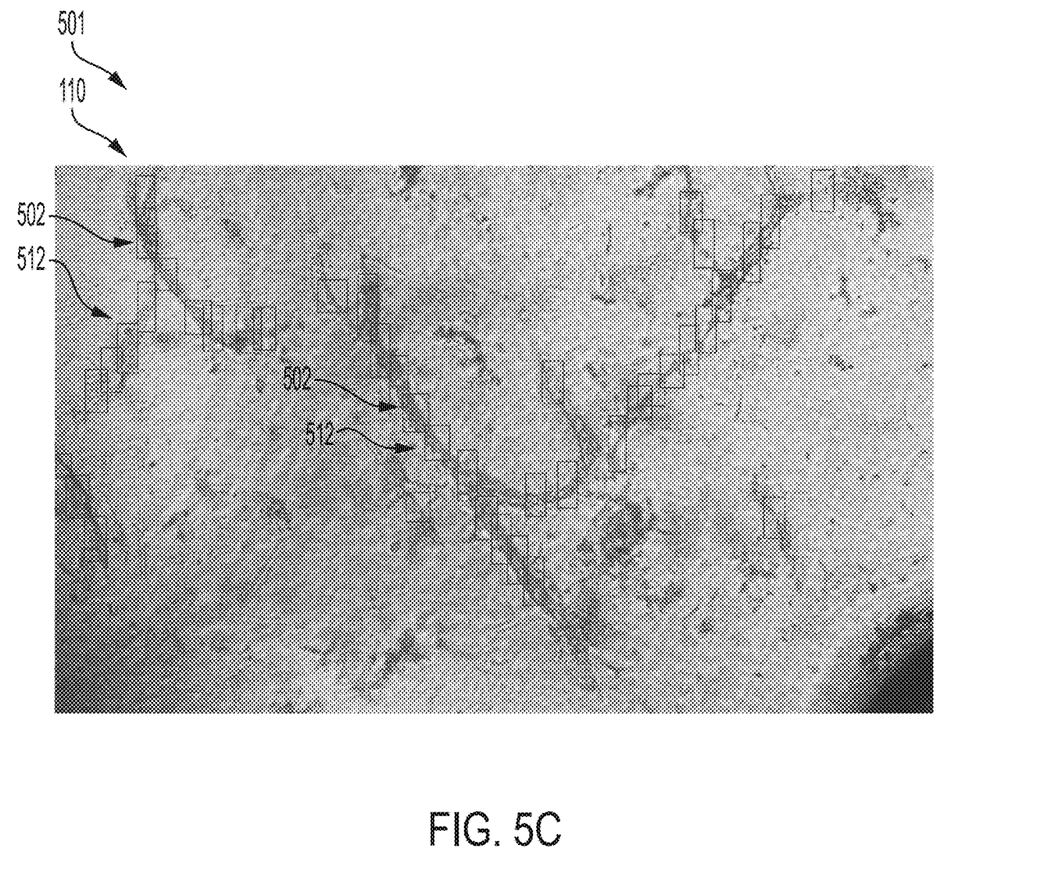
FIG. 5C depicts system-generated annotations of the image data of FIG. 5A, according to one or more embodiments shown and described herein.

Prior to training, the user annotations 504 may be transformed into more easily understood annotations by the one or more training servers 220. For example, the one or more processors 204 may execute transformation logic stored on the one or more memory modules 206 to detect and replace the one or more user annotations (e.g., lines and/or boxes) with a plurality of segmentation annotations. FIG. 5C illustrates an example transformation. In the illustrated embodiment, the user annotations of FIG. 5B have been replaced with a plurality of segmentation annotations 512 (e.g., discrete boxes). The discrete boxes break the user annotations into a discrete sections to allow discrete portions of image data to be analyzed, which may allow for better object detection. Once the user annotations have been transformed, the training image 500 may be sent to the one or more training servers 220 to generate trained models.

In some embodiments, data linked to the one or more user annotations 504 may also be transferred with the segmentation annotations 512. For example, user annotation data including that the user annotations had included lines and/or curves 510 may be used by the training server 220 to identify vessels 502. Colors may be used to distinguish between types of vessels (e.g., arteries, veins, etc.) or different portions of vessels (e.g., main vessels versus branches extending from main vessels). Shapes 508, as illustrated in FIG. 5B, such as rectangles, circles, or any regular or irregular polygonal or non-polygonal shape may be also used to identify biomedical objects. For example, rectangles, such as illustrated in FIG. 5B may depict locations of cells (e.g., myocytes, liver cells, or the like). Different colored shapes 508 may identify different types of cells. Machine-readable instructions stored on the one or more memory modules 206 or and/or at the one or more training servers 220 may correlate the different shapes and/or colors data, which may be provided along with the segmentation annotations 512, with different assigned biomedical structures.

In some embodiments, it is contemplated that annotations by the user may also be used to create a trained model 108 that is configured to identify acceptable and/or unacceptable biomedical structures. For example, the user may annotate the one or more training images to identify acceptable and/or unacceptable vascularization. For example, different annotation colors, shapes, etc. may be used to differentiate between acceptable and unacceptable biomedical structures. Such data may be transferred to the one or more training servers 220 along with the segmentation annotations 5012.

Upon completion of annotation and/ transformation of the user annotations into the plurality of segmentation annotations 512, at step 408, the user, using the one or more user interface devices 214, may initiate, via the one or training servers 220 and/or the machine-learning module 216, recognition of the one or more biomedical objects based on the user annotations 504 and/or the plurality of segmentation annotations 512 to produce a trained model 108 for identifying the one or more biomedical objects (e.g., cells, cellular structures, vascularization, etc.). As noted above, training may occur in one or more containers or container instances produced within the one or more training servers 220. Upon completion of training, the one or more training models may be stored in storage of the one or more training servers 220. (e.g., in cloud storage, Scalable Meta Data storage, Scalable Blob storage, or the like) and/or on the one or more memory modules 206 of the system 200. Trained models 108 may be later accessed for use by the system 200 for automated biomedical object segmentation.

Referring again to FIG. 3, at step 304, a user may start a new project and/or open an old project to update the biomedical object segmentation determination 110 for a particular biological construct. As noted above, image data 104 may be static or may be a live video feed. A user, using the one or more user input device may initiate biomedical object segmentation with the one or more processors 204 via the data analytics module 102. Selection may include choosing an available trained model 108 to be applied to the image data 104. For example, a user may choose a trained model 108 they created or another available trained model 108. In some embodiments, several training models may be combined by the machine-learning module 216 and artificial intelligence model 118 to create a combined trained model 108 for more robust biomedical object identification.

A new project may refer to a new biomedical object segmentation determination 110. It is noted that biomedical constructs are typically grown and observed over time. Accordingly, in some embodiments, a user may simply wish to update an existing project to see changes in formation of biomedical objects. Accordingly, in some embodiments, projects are stored on the one or more memory modules 206 and/or one or more servers, for later retrieval and update. Accordingly, a user, using the one or more user interface devices 214 may choose to open and update a pre-existing project. In some embodiments, a project may be automatically run and generated by the system 200. For example, the system 200 may, based on machine-readable instructions executed by the one or more processors 204, may periodically (e.g., every 5 hours, every 2 days, every 5 days, every 10 days, etc.) and/or continuously monitor live streams of image data 104 of a biological construct to detect biomedical objects. For example, the system 200 may be configured to detect and identify new vascular growth (e.g., sprouts), new cells, or the like.

Figure 5D:
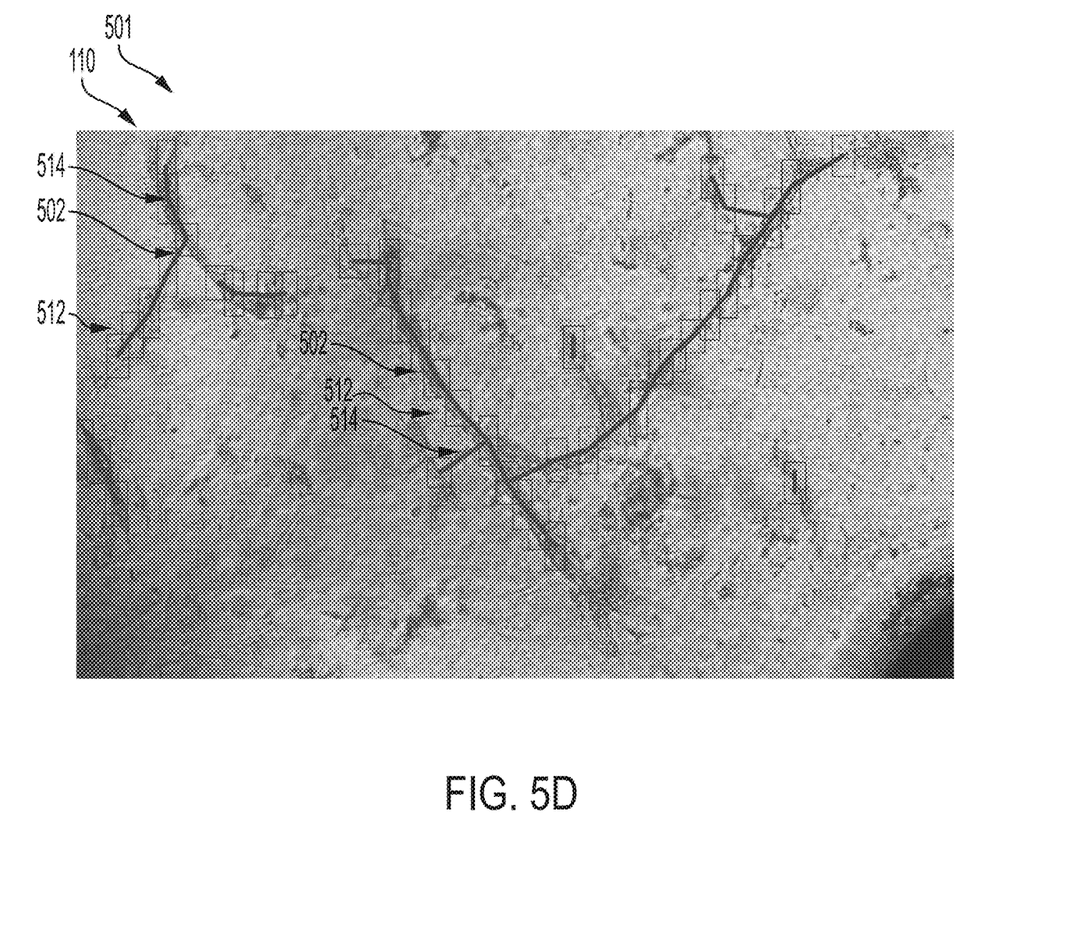
FIG. 5D depicts system-generated annotations of the image data of FIG. 5A, according to one or more embodiments shown and described herein.

Referring again to FIG. 3, in response to starting a new project and or updating an old project, the method 300 of automated biomedical object segmentation may include receiving image data 104 with the one or more processors 204 of the biological constructs, at step 306. Upon selection of a user to analyze the image data 104 or automatically upon opening a project, the one or more processors 204 may execute machine-readable instructions to retrieve the desired trained model 108, and with the machine-learning module 216 and the image analytics module 212, analyze the image data 104 against the trained model 108 using object recognition to identify biomedical objects within the image data 104, at step 308. Once identified, the system 200 may generate processed image data 501 and may automatically annotate the processed image data 501, at step 310, and as illustrated in FIG. 5D. The machine annotated image data 501 may then be displayed to the user with the one or more user interface devices 214, at step 312. In some embodiments, annotations may be made in real-time or near real-time as the image data 104 is received by the system 200 such that the user can monitor formation of biological objects within the biological construct in real-time (e.g., with minimal delays of, for example, less than 5 minutes, less than 1 minutes, less than 30 seconds, less than 5 seconds, etc.).

In some embodiments, the method 300 may include receiving, with a user interface device 214, one or more user preferences 106, as noted above. A user preference 106 may include, for example, identification of particular types of biomedical objects, particular annotation outputs by the system 200, a desired region analysis, a score analysis (e.g., a vascularization score analysis, a biomedical object count analysis, etc.) or any combination thereof.

In some embodiments, in performing a score analysis, the system 200 may further be able to score images based on, for example, a vascular score analysis (e.g., number of vessel branches, number of vessel segments, segment length density (total length/field of view), branch density (number of branches/length density), etc.), a biomedical object count analysis (e.g., a number of cells, a number of vessels, etc.), other counts or features (e.g., number of types of cells, cell density, a-cell structure density, etc.). In some embodiments, the system 200 may, based on logic executed by the one or more processors 204, predict a score value. A predicted score value may be derived based one or more experienced user scoring, which may be included in the user annotations, for example. Accordingly, score values may be stored along with a training model as described above, to allow the one or more processors 204 via the machine-learning module 216 to determine a predicted score for a particular biological construct.

FIG. 5D illustrates example system-generated biomedical object segmentation determinations 110. In this embodiment, the processed image 501 is annotated by the system 200 to identify biomedical objects. In this embodiment, portions that are recognized by the system 200 and translated into object indicator 513, such as the illustrated boxes, which are displayed to the user on a display of the user interface device 214. The object indicator 513 may appears similar to the segmentation annotations 512, shown in FIG. 5C. It is noted that though objected indicators 514 are illustrated as boxes in FIG. 5C, other shapes are contemplated and possible. In embodiments, the system 200 may further transform the object indicators 513 or data correlating to the object indicators to display lines 514 (e.g., polylines, curves, regressions, or the like) to estimate the length and location of the biomedical objects (vascularization in the illustrated case). In some embodiments, both object indicators 513 and lines 514 may be displayed simultaneously. Accordingly, biomedical object segmentation determinations 110, may include any number of type of object indicators 513 and/or lines 514 to illustrate the location and/or size of the biomedical object (in this case vascularization 502). In some embodiments, additional outputs may include score analyses, which may, for example, appear as text within the application and/or web portal. Accordingly, biomedical object segmentation results may be intuitively interpreted by a user.

Embodiments can be described with reference to the following numbered clauses with preferred features laid out in the dependent clauses:

1. A system for biomedical object segmentation, the system comprising: one or more processors; one or more memory modules communicatively coupled to the one or more processors; and machine readable instructions stored in the one or more memory modules that cause the system to perform the following when executed by the one or more processors: receive image data of one or more biological constructs; analyze the image data to generate processed image data via a data analytics module; and automatically annotate the processed image data to indicate a location of one or more biological objects within the one or more biological constructs.

2. The system of clause 1, wherein the machine readable instructions further cause the system to perform the following when executed by the one or more processors: receive from a user, via a user interface device, a training request; receive one or more training images of a biological construct; receive user annotations to the one or more training images, via the user interface device; transform, with the one or more processors; the user annotations into a plurality of segmentation annotations; identifying one or more biomedical objects within the one or more training images initiates, via a training server, recognition of the one or more biomedical objects based on the plurality of segmentation annotations; and stores, on the one or more memory modules, identifiable characteristics of the one or more biomedical objects for access by the data analytics module to identify one or more biomedical objects within the one or more biological constructs.

3. The system of any preceding clause, wherein the image data comprises live video image data of the one or more biological constructs.

4. The system of clause 3, wherein the image data is processed and annotated in real-time.

5. The system of any preceding clause, wherein a user, via a user interface device, can choose a selected region of the image data for analyzing via the data analytics module.

6. The system of any preceding clause, wherein the system is configured to identify vascularization.

7. The system of any preceding clause, wherein the system is configured to identify cellular structures.

8. A training server for detection a biomedical objects, the training server comprising: one or more processors; one or more memory modules communicatively coupled to the one or more processors; and machine readable instructions stored in the one or more memory modules that cause the training server to perform the following when executed by the one or more processors: receive one or more training images of a biological construct; receive user annotations to the one or more training images, via a user interface device, identifying one or more biomedical objects within the one or more training images; initiate recognition of the one or more biomedical objects based on the user annotations; and store, on the one or more memory modules, identifiable characteristics of the one or more biomedical objects for automatic identification of one or more biomedical objects within a biological construct.

9. The training server of clause 8, wherein the one or more training images comprise static images.

10. The training server of clause 8 or 9, wherein the one or more training images comprise video images.

11. The training server of any of clauses 8-10, wherein the user annotations include identification of vascularization.

12. The training server of any of clauses 8-11, wherein the user annotations include identification of cellular structures.

13. The training server of any of clauses 8-12, wherein the user annotations may include identification of acceptable and/or unacceptable vascularization for identifying acceptable and/or unacceptable vascularization in the biological construct.

14. A method for biomedical object segmentation, the method comprising: receiving, with one or more processors, image data of one or more biological constructs; analyzing, with the one or more processors, the image data to generate processed image data via a data analytics module; and automatically annotating the processed image data, with the one or more processors, to indicate a location of one or more biomedical objects within the one or more biological constructs.

15. The method of clause 14, wherein the image data comprises live video image data of the one or more biological constructs.

16. The method of clause 15, wherein the image data is processed and annotated in real-time.

17. The method of any of clauses 14-16, further comprising receiving, with a user interface device, an analyzation preference including a desired region analysis, a vascularization score analysis, a biomedical object count analysis, or a combination thereof.

18. The method of any of clauses 14-17, wherein analyzing the image data further comprises identifying vascularization within the one or more biological constructs.

19. The method of clauses 14-18, wherein analyzing the image data further comprises identifying cellular structures within the one or more biological constructs.

20. The method of any of clauses 14-19, further comprising automatically communicating, with network interface hard, the processed image data to a user interface device.

21. A method for training a model for biomedical object segmentation, the method includes: receiving from a user, via a user interface device, a training request; receiving one or more training images of a biological construct; receiving user annotations to the one or more training images, via the user interface device, identifying one or more biomedical objects within the one or more training images; transforming, with one or more processors; the user annotations into a plurality of segmentation annotations; initiating, via a training server, recognition of the one or more biomedical objects based on the plurality of segmentation annotations; and storing, on the one or more memory modules, identifiable characteristics of the one or more biomedical objects as a trained model for access by the data analytics module to identify one or more biomedical objects within the one or more biological constructs.

22. The method of clause 21, wherein the user annotations comprises at least one of shapes and polylines.

23. The method of clause 22, wherein transformation of the user annotations into a plurality of segmentation annotations comprises segmenting the at least one of shapes and polylines in to discrete sections.

24. The method of clause 23, wherein the discrete sections are represented by polygonal shapes.

In should now be understood that embodiments as described herein are directed to identifying biomedical structures, also known as biomedical object segmentation, within biological constructs from image data. In some embodiments, such identification may occur in real-time as changes occur to the biological construct. As noted above, identifying biomedical structures within a biological constructs may be difficult and time-consuming. Additionally, identification must generally be performed by highly trained individuals. Absence of such highly trained individuals may make it difficult to perform biomedical object segmentation. Moreover, biomedical object segmentation may be subject to human biases and errors, which could lead to inconsistent analyses/detection of biomedical objects within a biological construct. Accordingly, the present disclosure is directed to an intelligent system for performing object segmentation analysis from image data of a biological construct, which may provide faster, more consistent identification results It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for biomedical object segmentation, the system comprising:
one or more processors;
one or more memory modules communicatively coupled to the one or more processors; and
machine readable instructions stored in the one or more memory modules that cause the system to perform the following when executed by the one or more processors:
receive image data of one or more biological constructs;
analyze the image data to generate processed image data via a data analytics module to recognize biomedical objects; and
automatically annotate the processed image data to indicate a location of one or more biological objects within the one or more biological constructs, the automatic annotation of the processed image data is based on:
transforming user annotations to one or more training images into a plurality of segmentation annotations,
initiating, via a training server, recognition of one or more biomedical objects in the one or more training images based on the plurality of segmentation annotations, and
storing, on the one or more memory modules, identifiable characteristics of the one or more biomedical objects in the one or more training images for access by the data analytics module.

2. The system of claim 1, wherein the machine readable instructions further cause the system to perform the following when executed by the one or more processors:
receive from a user, via a user interface device, a training request;
receive the one or more training images of a biological construct;
receive the user annotations to the one or more training images, via the user interface device, the user annotations identifying the one or more biomedical objects within the one or more training image.

3. The system of claim 1, wherein the image data comprises live video image data of the one or more biological constructs.

4. The system of claim 3, wherein the image data is processed and annotated in real-time.

5. The system of claim 1, wherein a user, via a user interface device, can choose a selected region of the image data for analyzing via the data analytics module.

6. The system of claim 1, wherein the system is configured to identify vascularization.

7. The system of claim 1, wherein the system is configured to identify cellular structures.

8. A method for biomedical object segmentation, comprising:
receiving, with one or more processors, image data of one or more biological constructs;
analyzing, with the one or more processors, the image data to generate processed image data via a data analytics module to recognize biomedical objects; and
automatically annotating the processed image data, with the one or more processors, to indicate a location of one or more biomedical objects within the one or more biological constructs, the automatic annotation of the processed image data is based on:
transforming user annotations to one or more training images into a plurality of segmentation annotations,
initiating, via a training server, recognition of one or more biomedical objects in the one or more training images based on the plurality of segmentation annotations, and
storing, on the one or more memory modules, identifiable characteristics of the one or more biomedical objects in the one or more training images for access by the data analytics module.

9. The method of claim 8, wherein the image data comprises live video image data of the one or more biological constructs.

10. The method of claim 9, wherein the image data is processed and annotated in real-time.

11. The method of claim 8, further comprising receiving, with a user interface device, an analyzation preference including a desired region analysis, a vascularization score analysis, a biomedical object count analysis, or a combination thereof.

12. The method of claim 8, wherein analyzing the image data further comprises identifying vascularization within the one or more biological constructs.

13. The method of claim 8, wherein analyzing the image data further comprises identifying cellular structures within the one or more biological constructs.

14. The method of claim 8, further comprising automatically communicating, with network interface hardware, the processed image data to a user interface device.

* * * * *